United States Patent
Muramatsu

(10) Patent No.: US 11,320,800 B2
(45) Date of Patent: May 3, 2022

(54) OPTIMIZATION DEVICE

(71) Applicant: FANUC CORPORATION, Yamanashi (JP)

(72) Inventor: Toshifumi Muramatsu, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 17/010,096

(22) Filed: Sep. 2, 2020

(65) Prior Publication Data

US 2021/0124331 A1    Apr. 29, 2021

(30) Foreign Application Priority Data

Oct. 23, 2019   (JP) .............................. JP2019-192896

(51) Int. Cl.
| | | |
|---|---|---|
| *G05B 19/404* | (2006.01) | |
| *G05B 19/418* | (2006.01) | |
| *G05B 19/408* | (2006.01) | |

(52) U.S. Cl.
CPC ....... *G05B 19/404* (2013.01); *G05B 19/4083* (2013.01); *G05B 19/4183* (2013.01)

(58) Field of Classification Search
CPC .............. G05B 19/404; G05B 19/4183; G05B 19/4083; G05B 2219/35215; G05B 2219/35216; G05B 2219/35252; G05B 2219/36242; G05B 19/4093; Y02P 90/02
See application file for complete search history.

(56) References Cited

U.S. PATENT DOCUMENTS

| | | | | |
|---|---|---|---|---|
| 2004/0019770 A1* | 1/2004 | Kawahito | ............. | G06F 8/4441 712/227 |
| 2010/0063608 A1* | 3/2010 | Miller | .................. | G05B 19/409 700/97 |
| 2010/0125837 A1* | 5/2010 | Lobo | ....................... | G06F 8/443 717/157 |
| 2012/0239978 A1* | 9/2012 | Narutani | ............. | G06F 11/3612 714/32 |

FOREIGN PATENT DOCUMENTS

JP    10-320027    12/1998

* cited by examiner

*Primary Examiner* — Christopher E. Everett
(74) *Attorney, Agent, or Firm* — Wenderoth, Lind & Ponack, L.L.P.

(57) ABSTRACT

To optimize NC program cores included in a generated machining program and expedite operation of a machine tool. An optimization device includes a block analysis unit, a code processing unit, and a program generation unit. The block analysis unit analyzes a preparatory function code and/or an auxiliary function code for each of a plurality of blocks included in a first program. The code processing unit performs a process on the preparatory function code and/or the auxiliary function code in a plurality of successive blocks based on a result of the analysis by the block analysis unit and optimizes the first program. The program generation unit generates the first program optimized by the code processing unit as a second program.

11 Claims, 13 Drawing Sheets

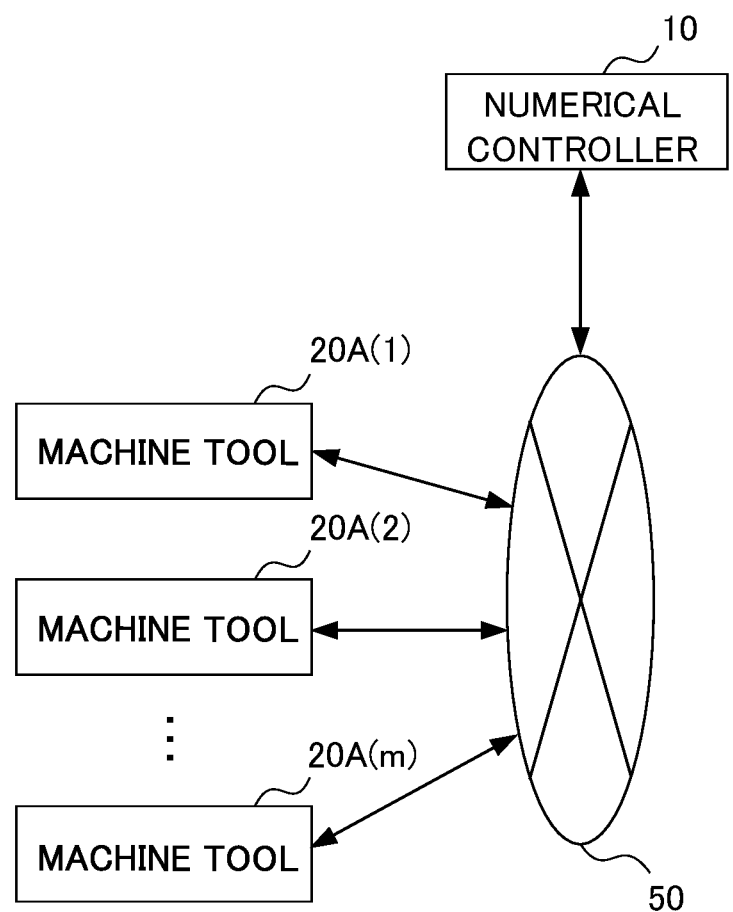

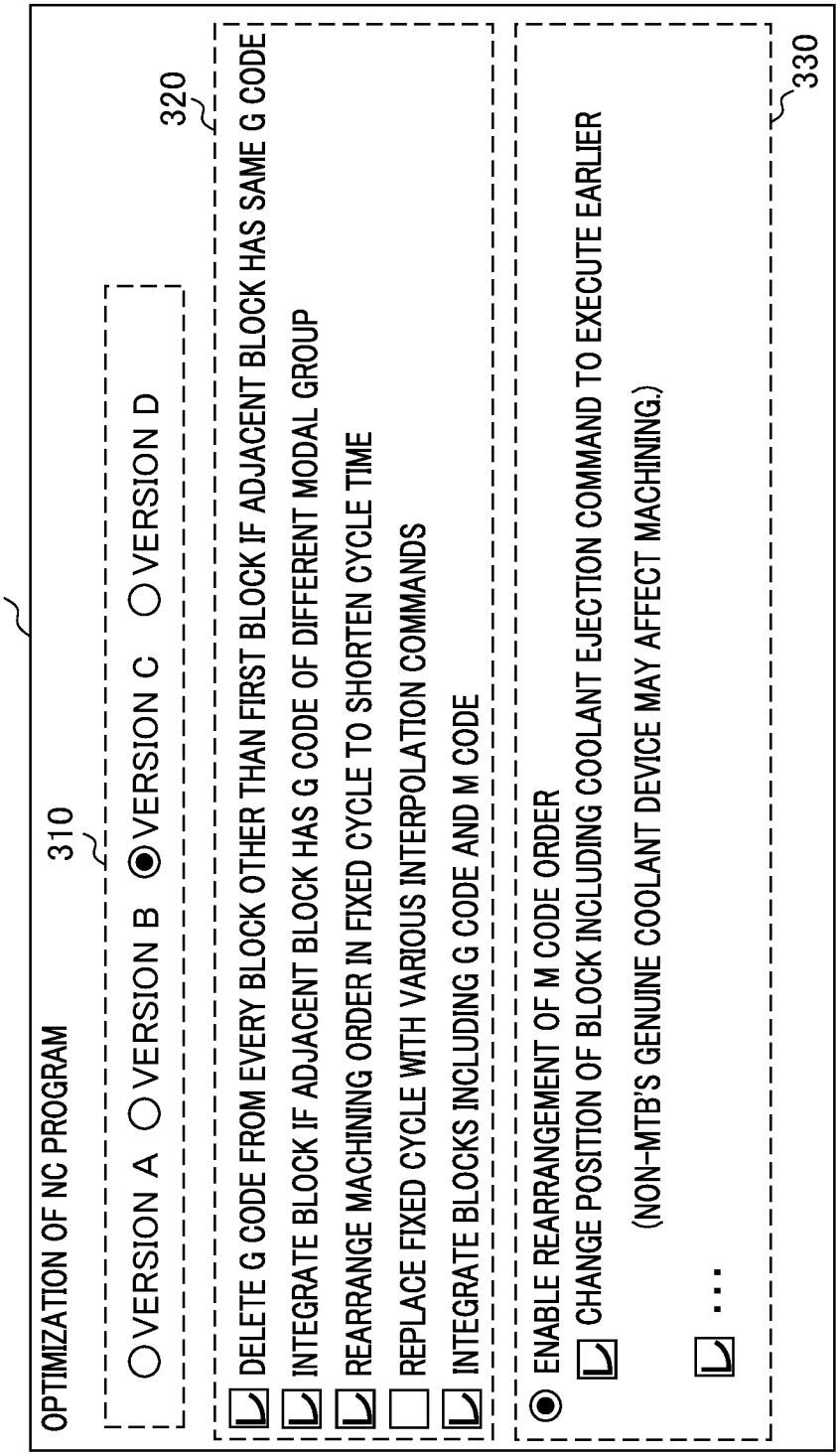

OPTIMIZATION DEVICE

This application is based on and claims the benefit of priority from Japanese Patent Application No. 2019-192896, filed on 23 Oct. 2019, the content of which is incorporated herein by reference.

BACKGROUND OF THE INVENTION

Field of the Invention

The present invention relates to an optimization device.

Related Art

Machining programs are, for example, generated by a CAD/CAM device or an operator or the like of a machine tool. Most of NC program codes such as preparatory functions (G functions) and auxiliary functions (M functions) by NC program codes included in machining programs are standardized by standards such as JIS B6314.

Aside from standards such as JIS B6314, however, machine tool builders have devised their own unique NC program codes for various additional functions including G functions and M functions for improving functions of machine tools and the like.

In this regard, a known technique is to refer to a conversion table storing the association between such unique NC program codes and other NC program codes specifying the same functions as the unique NC program codes, and upon an input of an NC program code according to different specifications, execute a machining program by translating the inputted NC program code into a corresponding unique code. See, for example, Patent Document 1.

Patent Document 1: Japanese Unexamined Patent Application, Publication No. H10-320027

SUMMARY OF THE INVENTION

Machining programs for various machine tools are generated by a postprocessor of a CAD/CAM device. However, the machining programs are generated with an emphasis on reliable operation, and can therefore involve duplication of NC program codes and insertion of an NC program code being a G function (also referred to below as "G code") and an NC program code being an M function (also referred to below as "M code") that are not necessarily required. Furthermore, the processing time is not necessarily considered in determining the order of processes. This disadvantageously makes operation of the machine tools slow and the cycle time longer. It is to be noted that machining programs created by an operator, particularly by an operator unfamiliar with machining programs, also involve similar problems.

It is therefore desired to optimize NC program codes included in a generated machining program and expedite operation of a machine tool.

An optimization device according to an aspect of the present disclosure includes: a block analysis unit configured to analyze a preparatory function code and/or an auxiliary function code for each of a plurality of blocks included in a first program; a code processing unit configured to perform a process on the preparatory function code and/or the auxiliary function code in a plurality of successive blocks based on a result of the analysis by the block analysis unit and optimize the first program; and a program generation unit configured to generate the first program optimized by the code processing unit as a second program.

According to one embodiment, it is possible to optimize NC program codes included in a generated machining program and to expedite operation of a machine tool.

BRIEF DESCRIPTION OF THE DRAWINGS

FIG. 2A illustrates an example of a source program for describing a deletion process that is performed by a deletion processing unit;

FIG. 2B illustrates an example of the source program after the deletion process. FIG. 3A illustrates an example of a source program for describing a block integration process that is performed by a second integration processing unit;

FIG. 3B illustrates an example of the source program after the block integration process;

FIG. 4A illustrates an example of a source program for describing the block integration process that is performed by the second integration processing unit;

FIG. 4B illustrates an example of the source program after the block integration process;

FIG. 5A illustrates an example of a source program for describing a rearrangement process that is performed by a block rearrangement processing unit;

FIG. 5B illustrates an example of the source program after the rearrangement process;

FIG. 8A illustrates an example of a source program for describing a replacement process that is performed by a replacement processing unit;

FIG. 8B illustrates an example of the source program after the replacement process;

FIG. 14 illustrates an example of a constitution of a control system; and

FIG. 15 illustrates an example of a human-machine interface.

DETAILED DESCRIPTION OF THE INVENTION

<Embodiment>

The following first describes an overview of the present embodiment. An optimization device according to the present embodiment analyzes a preparatory function code and/or an auxiliary function code for each of blocks included in a first program. The optimization device performs an optimization process for reducing the processing time on the preparatory function code and/or the auxiliary function code in a plurality of successive blocks based on a result of the analysis, optimizes the first program, and generates the optimized first program as a second program.

Thus, according to the present embodiment, it is possible to address the problem of "optimizing NC program codes included in a generated machining program and expediting operation of a machine tool".

Through the above, an overview of the present embodiment has been described.

The following then describes a constitution of the present embodiment in detail with reference to the drawings.

Figure 1:
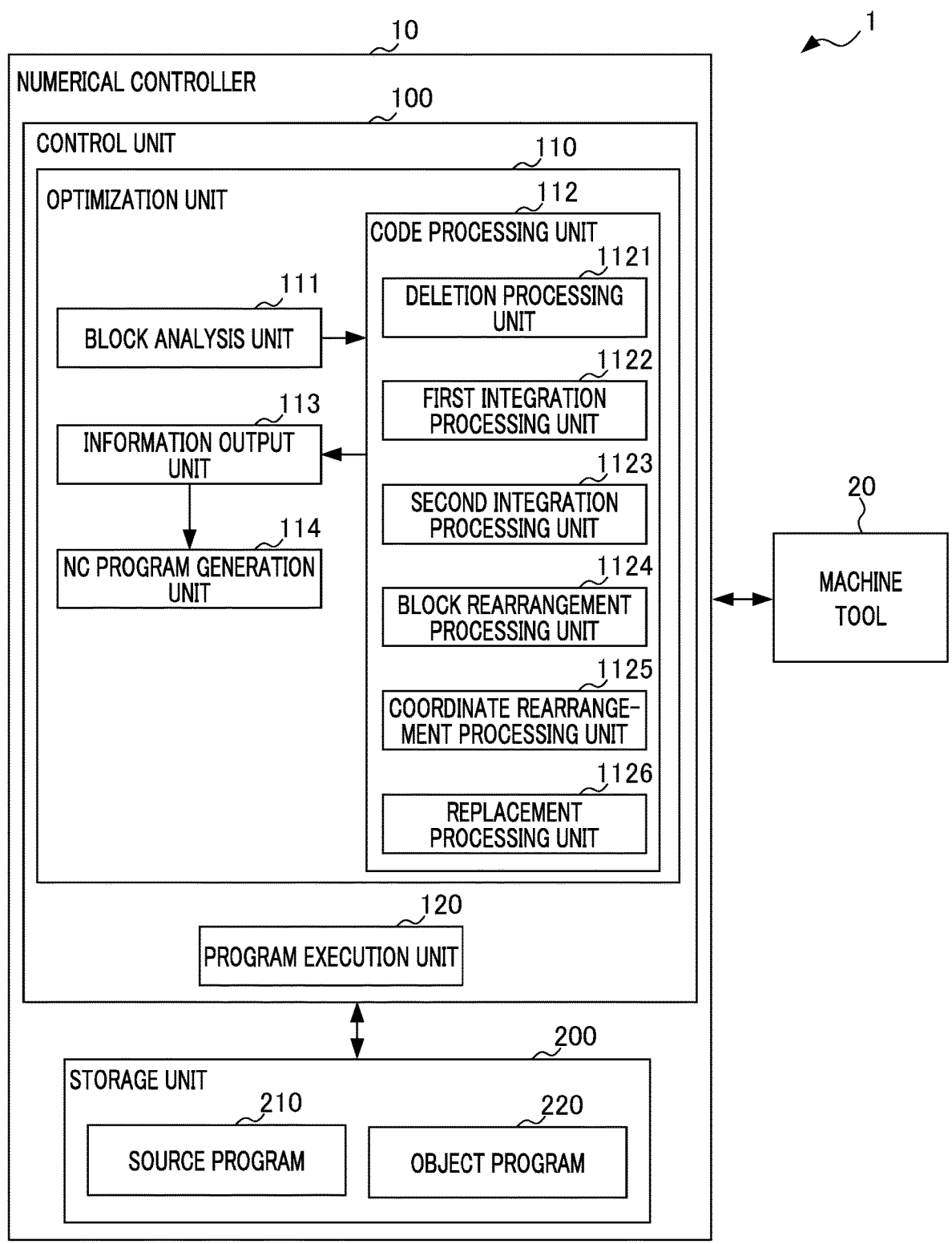
FIG. 1 is a functional block diagram illustrating a functional constitution example of a control system according to one embodiment.

FIG. 1 is a functional block diagram illustrating a functional constitution example of a control system according to one embodiment. As illustrated in FIG. 1, a control system 1 includes a numerical controller 10 and a machine tool 20.

The numerical controller 10 and the machine tool 20 may be connected to each other directly via connection interfaces, not shown. Alternatively, the numerical controller 10 and the machine tool 20 may be connected to each other via a network, not shown, such as a local area network (LAN) or the Internet. In this case, the numerical controller 10 and the machine tool 20 each include a communication unit, not shown, for communication therebetween using the above-described connection. It is to be noted that the machine tool 20 may include the numerical controller 10 as described below.

The numerical controller 10 is a numerical controller known to those skilled in the art, and generates an operation command based on control information and sends the generated operation command to the machine tool 20. Thus, the numerical controller 10 controls operation of the machine tool 20. In a case where the machine tool 20 is a robot or the like, the numerical controller 10 may be, for example, a robot controller or the like.

Furthermore, the control target of the numerical controller 10 is not limited to the machine tool 20 or a robot. The numerical controller 10 is widely applicable to industrial machines in general. Examples of industrial machines include various machines and tools such as machine tools, industrial robots, service robots, forging machines, and injection molding machines.

As illustrated in FIG. 1, the numerical controller 10 has a control unit 100 and a storage unit 200. In order for the numerical controller 10 to operate as an optimization device, the control unit 100 has an optimization unit 110 and a program execution unit 120. Furthermore, the optimization unit 110 has a block analysis unit 111, a code processing unit 112, an information output unit 113, and an NC program generation unit 114. Furthermore, the code processing unit 112 has a deletion processing unit 1121, a first integration processing unit 1122, a second integration processing unit 1123, a block rearrangement processing unit 1124, a coordinate rearrangement processing unit 1125, and a replacement processing unit 1126.

<Storage Unit 200>

The storage unit 200 is, for example, random access memory (RAM) or a hard disk drive (HDD). The storage unit 200 stores a source program 210 and an object program 220 therein.

The source program 210 is an unoptimized machining program generated by and acquired from an external device such as a CAD/CAM device or an operator or the like of the machine tool 20.

The object program 220 is an optimized machining program, which is the source program 210 processed by the code processing unit 112 described below and generated by the NC program generation unit 114 described below.

<Control Unit 100>

The control unit 100 includes a central processing unit (CPU), read-only memory (ROM), RAM, complementary metal-oxide semiconductor (CMOS) memory, and the like known to those skilled in the art, which are configured to communicate with one another via a bus.

The CPU is a processor that performs overall control of the numerical controller 10. The CPU reads out a system program and an application program stored in the ROM via the bus, and performs overall control of the numerical controller 10 in accordance with the system program and the application program. Thus, the control unit 100 is configured to implement functions of the block analysis unit 111, the code processing unit 112, the information output unit 113, and the NC program generation unit 114 as illustrated in FIG. 1. Various data such as temporary calculation data and display data are stored in the RAM. The CMOS memory is backed up using a battery, not shown, and is non-volatile memory that retains stored information even after the numerical controller 10 has been turned off.

The block analysis unit 111 acquires, for example, a machining program generated by the external device such as a CAD/CAM device and/or the operator as the source program 210 from the storage unit 200. The block analysis unit 111 analyzes a preparatory function code (G code) and/or an auxiliary function code (M code) for each of blocks included in the acquired source program 210.

It is to be noted that the source program 210 is, for example, based on a standard such as JIS B6315-1 or JIS B6315-2.

The code processing unit 112 performs an optimization process on a predetermined preparatory function code and/or a predetermined auxiliary function code in a plurality of successive blocks of the source program 210 based on a result of the analysis by the block analysis unit 111 and optimizes the source program 210.

The deletion processing unit 1121 determines a duplication of a preparatory function code, which is unnecessary, in a plurality of successive blocks if the preparatory function code in one block is not a code that only affects the one block, and the preparatory function code in the one block is the same as a preparatory function code in any other block adjacent to the one block. The deletion processing unit 1121 deletes the preparatory function code from every block other than the first block among the plurality of successive blocks to have the preparatory function code.

FIGS. 2A and 2B illustrate an example of the source program 210 for describing a deletion process that is performed by the deletion processing unit 1121.

The source program 210 in FIG. 2A first causes a tool (not shown) in the machine tool 20 to move from the current tool position by "−10" in an X axis direction and "+10" in a Y axis direction at a speed "F350" through linear interpolation. Next, the source program 210 causes the tool (not shown) in the machine tool 20 to move from the post-move position by "−10" in the X axis direction and "−10" in the Y axis direction at a speed "F350" through linear interpolation. Lastly, the source program 210 causes the tool (not shown) in the machine tool 20 to move from the post-move position by "+10" in the X axis direction and "+10" in the Y axis direction at a speed "F350" through linear interpolation.

It is to be noted that preparatory function codes "G91" and "G01" are codes of modal groups, and therefore remain in effect once set until the setting thereof is changed or canceled. Accordingly, as illustrated in FIG. 2B, the deletion processing unit 1121 deletes the codes "G91" and "G01" from every block other than the first block in the source program 210 in FIG. 2A. This optimizes the source program 210, reducing processing by the numerical controller 10 and shortening the execution time in execution of the object program 220.

The first integration processing unit 1122 integrates a plurality of blocks among a plurality of successive blocks in a case where a preparatory function code in one block is not a code that only affects the one block, and the preparatory function code in the one block is a member of a modal group differing from that of a preparatory function code in any other block adjacent to the one block.

The second integration processing unit 1123 integrates a plurality of blocks among a plurality of successive blocks in a case where a preparatory function code in one block is not a code that only affects the one block, the preparatory function code in the one block is a member of a modal group differing from that of a preparatory function code in any other block adjacent to the one block, and an auxiliary function code included in the block adjacent to the one block does not have to independently give a command to the block adjacent to the one block and is not a conflicting operation.

FIGS. 3A and 3B illustrate an example of the source program 210 for describing a block integration process that is performed by the second integration processing unit 1123.

The source program 210 illustrated in FIG. 3A executes a tool change command "M6" in a block in the third line and executes a positioning command "G00" in a block in the fourth line. Here, the positioning command "G00" is not a code that only affects the block in the fourth line and is a member of a modal group differing from that of a cancel tool length offset command "G49" in the block in the adjacent third line. Furthermore, the tool change command "M6" does not have to independently give a command to other block and is not a conflicting operation. Accordingly, as illustrated in FIG. 3B, the second integration processing unit 1123 integrates the tool change command "M6" in the block in the third line and the positioning command "G00" in the block in the fourth line. This optimizes the source program 210, allowing the tool change command "M6" and the positioning command "G00" to be simultaneously executed, and reducing the cycle time.

FIGS. 4A and 4B illustrate an example of the source program 210 for describing the block integration process that is performed by the second integration processing unit 1123.

The source program 210 illustrated in FIG. 4A executes a tool length offset command "G43" in a block in the second line and executes a spindle rotation command "M3" in a block in the third line. Here, the tool length offset command "G43" is not a code that only affects the block in the second line and is a member of a modal group differing from that of the cancel tool length offset command "G49" or any other code in a block in the adjacent first line. Furthermore, the spindle rotation command "M3" does not have to independently give a command to other block and is not a conflicting operation. Accordingly, as illustrated in FIG. 4B, the second integration processing unit 1123 integrates the tool length offset command "G43" in the block in the second line and the spindle rotation command "M3" in the block in the third line. This optimizes the source program 210, allowing the tool length offset command "G43" and the spindle rotation command "M3" to be simultaneously executed, and reducing the influence of the processing time of the auxiliary function code on the cycle time.

The block rearrangement processing unit 1124 rearranges the order of a plurality of successive blocks in a case where an auxiliary function code in one block is not an operation conflicting with a preparatory function code or an auxiliary function code included in a block preceding the one block.

FIGS. 5A and 5B illustrate an example of the source program 210 for describing a rearrangement process that is performed by the block rearrangement processing unit 1124.

The source program 210 illustrated in FIG. 5A first executes the positioning command "G00", executes a coolant ejection command "M08", and then executes a linear interpolation movement command "G01". Here, the coolant ejection command "M08" is not an operation conflicting with the positioning command "G00" or the linear interpolation movement command "G01", which are preparatory function codes. Accordingly, as illustrated in FIG. 5B, the block rearrangement processing unit 1124 interchanges the coolant ejection command "M08" and the positioning command "G01" in the block in the first line. This optimizes the source program 210, reducing the execution time.

When the coolant ejection command "M08" is executed, there is a lag time before the coolant is actually ejected. The block rearrangement processing unit 1124 can therefore move the coolant ejection command "M08" from the block immediately before the linear interpolation movement command "G01" in the block in the third line to a block before the line having the positioning command "G00" to cause the machine tool 20 to perform a machining operation after it has been confirmed that the coolant is being ejected.

The coordinate rearrangement processing unit 1125 rearranges a plurality of coordinate values specified by dimension words included among a plurality of successive blocks to minimize the moving distance between the coordinate values or the total moving time in a case where a preparatory function code in the first block among the plurality of successive blocks is a fixed cycle preparatory function code, and a preparatory function code in the last block among the plurality of successive blocks is a preparatory function code of cancellation of the fixed cycle corresponding to the preparatory function code in the first block.

FIGS. 6A and 6B, and FIGS. 7A and 7B illustrate an example of the source program 210 for describing a rearrangement process that is performed by the coordinate rearrangement processing unit 1125.

Figures 6A, 6B:
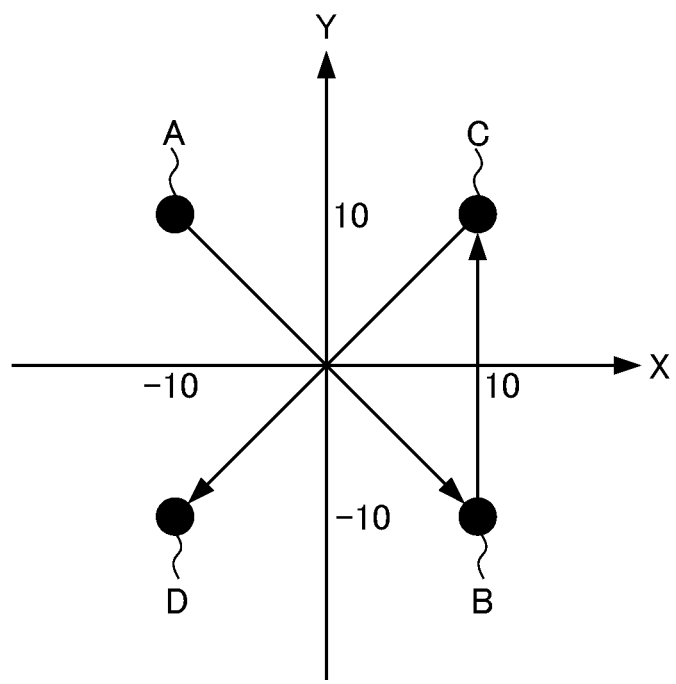
FIG. 6A illustrates an example of a source program for describing a rearrangement process that is performed by a coordinate rearrangement processing unit.
FIG. 6B illustrates an example of a route of a tool in a machine tool according to the source program illustrated in FIG. 6A.

The source program 210 in FIG. 6A has a drilling cycle, spot boring cycle command "G81", which is a fixed cycle preparatory function code, in the first block, and a cancel fixed cycle command "G80" corresponding to the "G81", in the fourth block. Accordingly, as illustrated in FIG. 6B, the source program 210 causes a tool (not shown) such as a drill in the machine tool 20 to move in the order of a commanded position A to a commanded position D based on coordinate values specified by dimension words included between the blocks in the first and fourth lines.

However, according to a route illustrated in FIG. 6B, the tool (not shown) in the machine tool 20 has to move an unnecessarily long distance, and the cycle time is long. The coordinate rearrangement processing unit 1125 therefore optimizes the order of the move from the commanded position A to the commanded position D to minimize the moving distance or the total moving time by, for example, taking the commanded positions A through D as nodes in the traveling salesman problem.

It is to be noted that the traveling salesman problem is a known method and detailed description thereof will be omitted. Furthermore, the method for optimizing the moving order to minimize the moving distance and the total moving time is not limited to the traveling salesman problem, and any other known method may be employed.

Figures 7A, 7B:
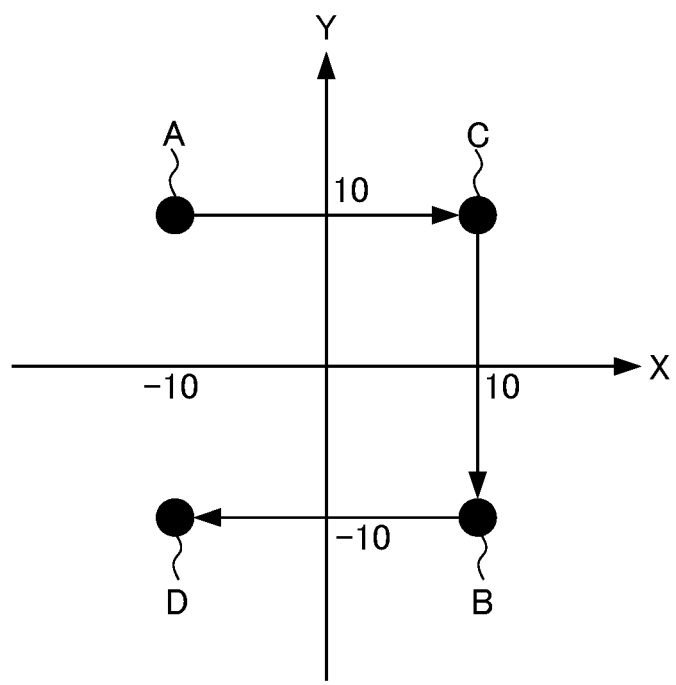
FIG. 7A illustrates an example of the source program after the rearrangement process.
FIG. 7B illustrates an example of a route of the tool in the machine tool according to the source program illustrated in FIG. 7A.

FIG. 7A illustrates an example of the source program 210 after the rearrangement process. FIG. 7B illustrates an example of a route of the tool (not shown) in the machine tool according to the source program 210 illustrated in FIG. 7A.

As illustrated in FIG. 7A, the coordinate values in the blocks in the second and third lines in the source program 210 are interchanged compared to the source program 210 in FIG. 6A. As a result, as illustrated in FIG. 7B, the tool (not shown) such as a drill in the machine tool 20 moves in the order of the commanded position A, the commanded position C, the commanded position B, and the commanded position D. This reduces the cumulative moving distance of the tool (not shown) in the machine tool 20, shortening the cycle time.

It is to be noted that where the distance between the commanded positions is taken as a cost and the moving distance is taken as an evaluation function based on the traveling salesman problem, the evaluation function of the route illustrated in FIG. 6B is "48" and the evaluation function of the route illustrated in FIG. 7B is "40". That is, the route illustrated in FIG. 7B is the shortest.

The replacement processing unit 1126 replaces a plurality of successive blocks with a combination of preparatory function codes from a fixed cycle preparatory function code to an interpolation preparatory function code in a case where a preparatory function code in the first block among the plurality of successive blocks is a fixed cycle preparatory function code, and a preparatory function code in the last block among the plurality of successive blocks is a preparatory function codes of cancellation of the fixed cycle corresponding to the preparatory function code in the first block.

FIGS. 8A and 8B illustrate an example of the source program 210 for describing a replacement process that is performed by the replacement processing unit 1126.

The source program 210 in FIG. 8A has the drilling cycle, spot boring cycle command "G81", which is a fixed cycle preparatory function code, in the first block, and the cancel fixed cycle command "G80" corresponding to the "G81", in the second block. In this case, as illustrated in FIG. 8B, the replacement processing unit 1126 replaces the fixed cycle preparatory function codes such as the drilling, spot boring cycle command "G81" with various interpolation preparatory function codes such as the positioning command "G00" and the linear interpolation movement command "G01". Replacing fixed cycle preparatory function codes with various interpolation preparatory function codes as described above enables shortening of the execution time.

The information output unit 113 outputs information indicating the content of the process performed by the code processing unit 112 to a block immediately before or after a block including a preparatory function code or an auxiliary function code optimized by the code processing unit 112. The information output unit 113 outputs the source program 210 having the outputted information to the NC program generation unit 114.

It is to be noted that the information output unit 113 may output the information indicating the content of the process performed by the code processing unit 112 to a display unit (not shown) such as a liquid crystal display included in the numerical controller 10. The display unit (not shown) may then display the content of the process performed by the code processing unit 112. This enables an operator of the numerical controller 10 to know what process has been performed on the source program 210.

Additionally, the information output unit 113 may calculate an estimated value of the execution time of the object program 220 based on the content of the process performed by the code processing unit 112 and output the estimated value to the display unit (not shown). The display unit (not shown) may then display the estimated value calculated by the information output unit 113. This enables the operator of the numerical controller 10 to know how much the execution time is to be shortened by the optimization process performed on the source program 210.

The NC program generation unit 114 generates the source program 210 optimized by the code processing unit 112 as the object program 220.

Specifically, the NC program generation unit 114 generates the object program 220 from the source program 210 processed by the code processing unit 112. The NC program generation unit 114 then stores the generated object program 220 in the storage unit 200.

It is to be noted that the NC program generation unit 114 may generate the object program 220 separately from the source program 210 or may generate the object program 220 to replace the source program 210.

The program execution unit 120 reads the object program 220 generated by the NC program generation unit 114 out of the storage unit 200 and executes the object program 220. The program execution unit 120 generates an operation command based on the object program 220 and sends the generated operation command to the machine tool 20 to control operation of the machine tool 20.

<Optimization Process by Numerical Controller 10>

The following describes operation related to the optimization process that is performed by the numerical controller 10 according to the present embodiment.

FIGS. 9 to 13 are flowcharts for describing the optimization process that is performed by the numerical controller 10. The flows shown herein are repeated every time a new source program 210 is acquired.

Figure 9:
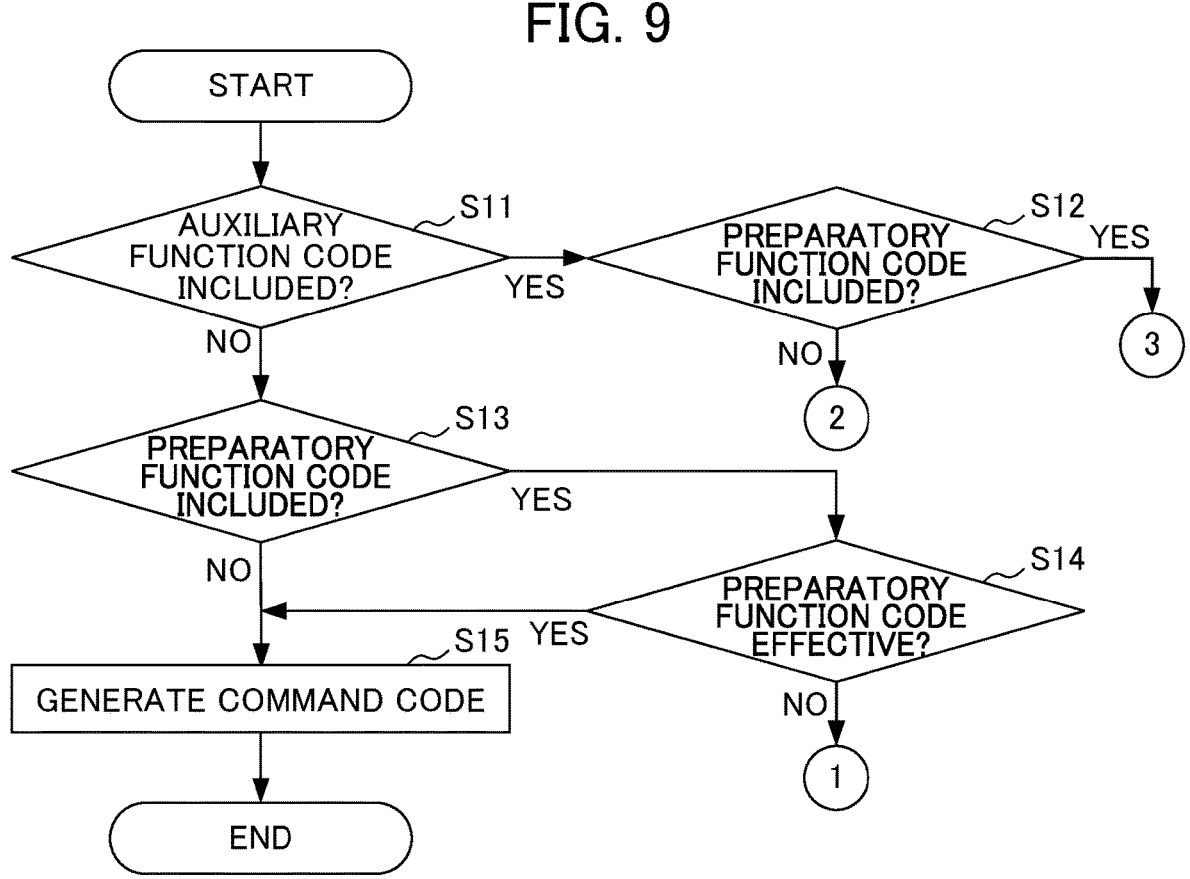
FIG. 9 is a flowchart for describing an optimization process that is performed by a numerical controller.

At step S11 in FIG. 9, the block analysis unit 111 determines whether or not one block of the source program 210 includes an auxiliary function code. If an auxiliary function code is included, the process advances to step S12. If no auxiliary function code is included, the process advances to step S13.

At step S12, the block analysis unit 111 determines whether or not the one block of the source program 210 includes a preparatory function code. If a preparatory function code is included, the process advances to step S41 in FIG. 12. If no preparatory function code is included, the process advances to step S31 in FIG. 11.

At step S13, the block analysis unit 111 determines whether or not the one block of the source program 210 includes a preparatory function code. If a preparatory function code is included, the process advances to step S14. If no preparatory function code is included, the process advances to step S15.

At step S14, the deletion processing unit 1121 determines whether or not the preparatory function code in the one block determined at step S13 is effective only in the one block. If the preparatory function code is effective only in the one block, the process advances to step S15. If the preparatory function code is not a code that is effective only in the one block, that is, if the preparatory function code is effective also in another block, the process advances to step S21 in FIG. 10.

At step S15, the code processing unit 112 generates a processed command code. Then, the numerical controller 10 ends the optimization process.

Figure 10:
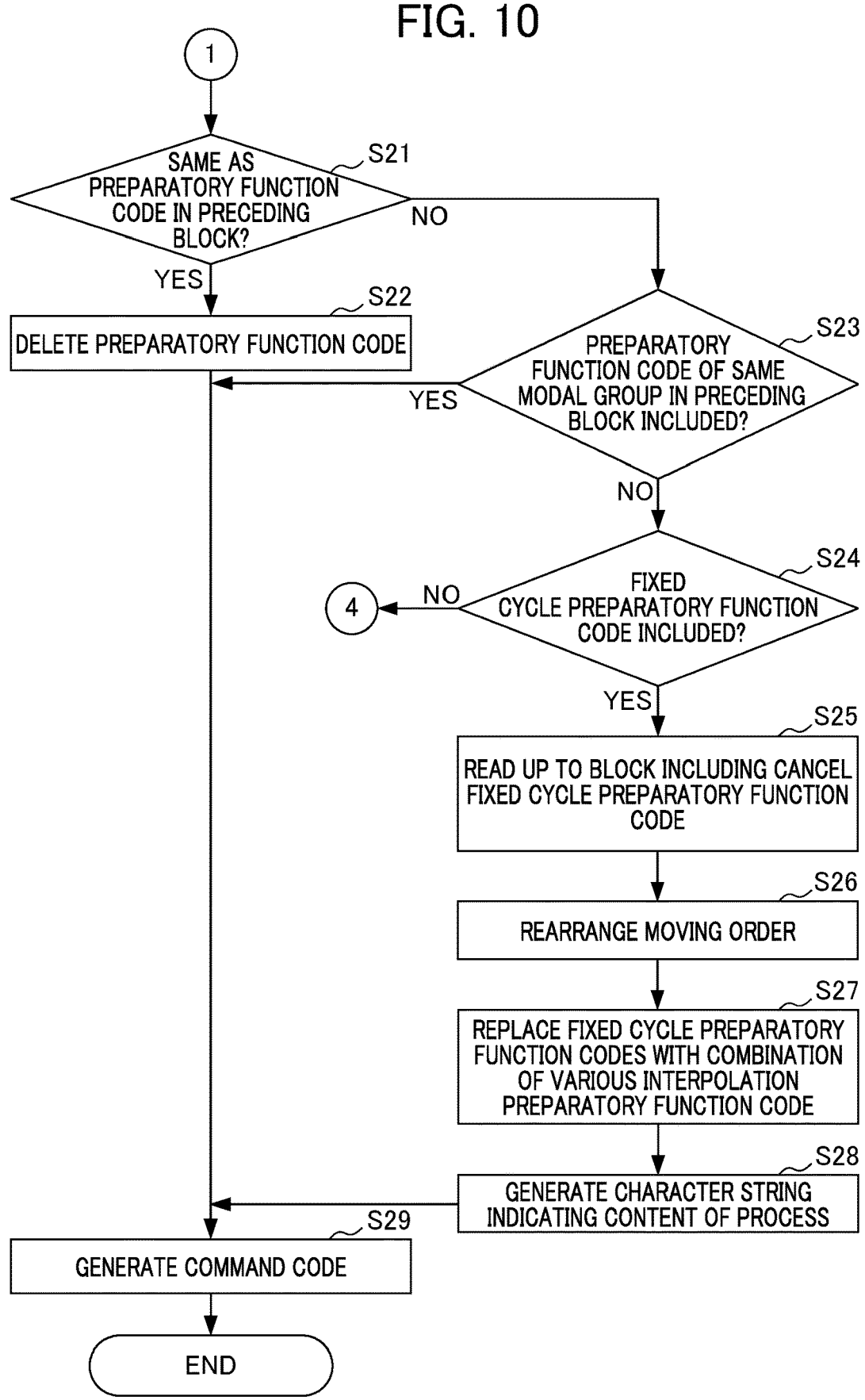
FIG. 10 is a flowchart illustrating a continuation of the optimization process illustrated in FIG. 9.

At step S21 in FIG. 10, the deletion processing unit 1121 determines whether or not the preparatory function code in the one block determined at step S14 in FIG. 9 is the same as a preparatory function code in a block preceding the one block. If the preparatory function code is the same as that in the preceding block, the process advances to step S22. If the preparatory function code differs from that in the preceding block, the process advances to step S23.

At step S22, the deletion processing unit 1121 deletes the preparatory function code in every block other than the first block to have the preparatory function code in the same manner as in FIG. 2B.

At step S23, the second integration processing unit 1123 determines whether or not the preparatory function code in the one block determined at step S21 includes a member of the same modal group as the preparatory function code in the preceding block. If the preparatory function code is a member of the same modal group as the preparatory function code in the preceding block, the process advances to step S29. If the preparatory function code is a member of a different modal group from the preparatory function code in the preceding block, the process advances to step S24.

At step S24, the coordinate rearrangement processing unit 1125 determines whether or not the one block determined at step S23 includes a fixed cycle preparatory function code. If a fixed cycle preparatory function code is included, the process advances to step S25. If no fixed cycle preparatory function code is included, the process advances to step S51 in FIG. 13.

At step S25, the coordinate rearrangement processing unit 1125 reads from the one block determined at step S24 up to a block including a preparatory function code of cancellation of the fixed cycle corresponding to the preparatory function code in the one block while saving coordinate values (addresses) of commanded positions in blocks succeeding the one block determined at step S24.

At step S26, the coordinate rearrangement processing unit 1125 rearranges the moving order by solving the traveling salesman problem with respect to the coordinate values of the commanded positions saved at step S25, taking the moving distance between the commanded positions or the moving time as an evaluation function.

At step S27, the replacement processing unit 1126 replaces the fixed cycle preparatory function codes with a combination of various interpolation preparatory function codes including the positioning command "G00", the linear interpolation movement command "G01", a clockwise circular interpolation "G02", and a counter-clockwise circular interpolation "G03".

At step S28, the information output unit 113 generates a character string (information) indicating the content of the process performed by the code processing unit 112 and outputs the generated character string to a block immediately before or after the block including the preparatory function code processed at step S26 or S27.

At step S29, the code processing unit 112 generates the processed command code. Then, the numerical controller 10 ends the optimization process.

Figure 11:
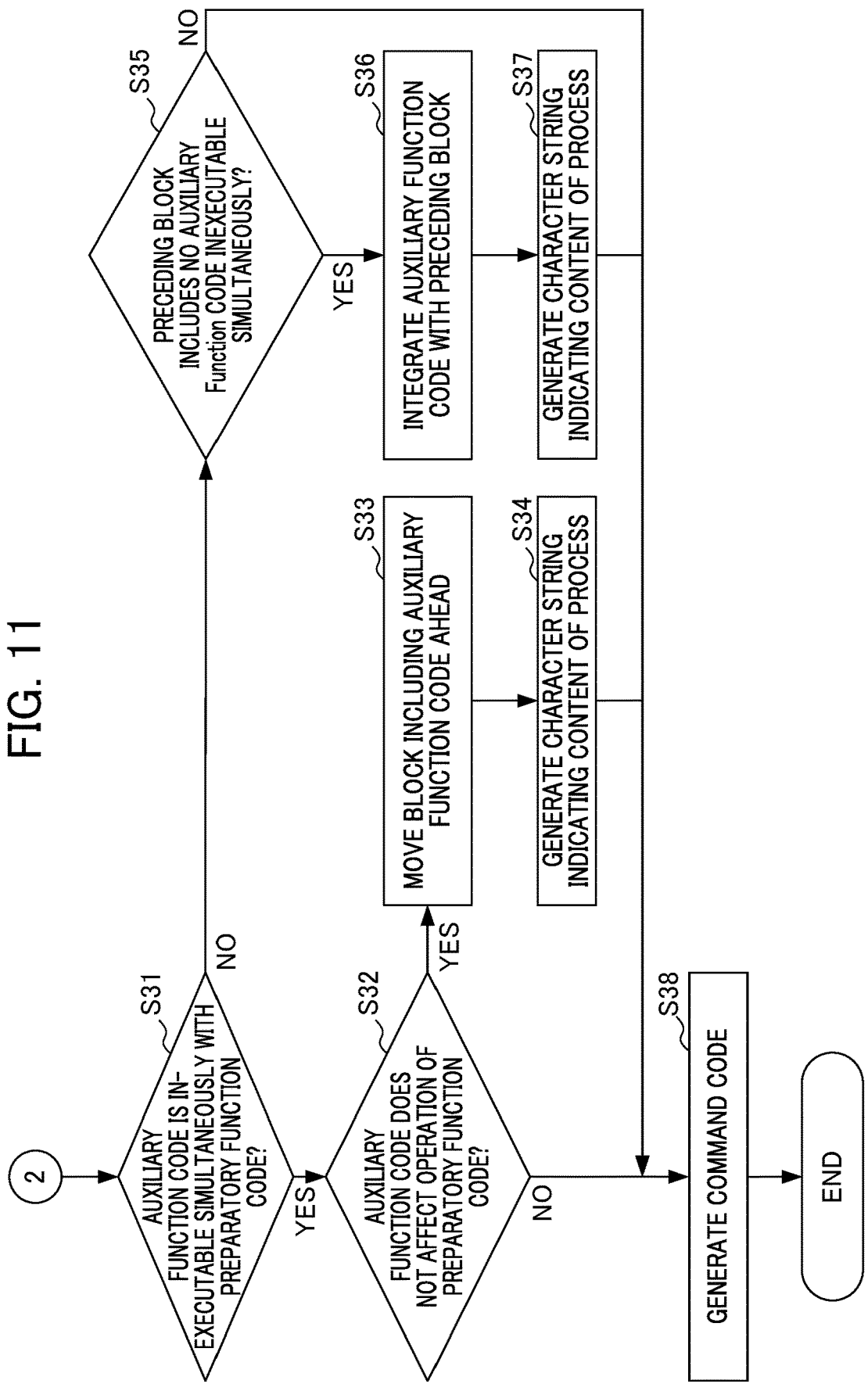
FIG. 11 is a flowchart illustrating a continuation of the optimization process illustrated in FIG. 9.

At step S31 in FIG. 11, the block rearrangement processing unit 1124 determines whether or not the auxiliary function code in the one block determined at step S12 in FIG. 1 is inexecutable simultaneously with a preparatory function code. If the auxiliary function code is inexecutable simultaneously with the preparatory function code in the preceding block, the process advances to step S32. If the auxiliary function code is executable simultaneously with the preparatory function code in the preceding block, the process advances to step S35.

At step S32, the block rearrangement processing unit 1124 determines whether or not the auxiliary function code does not affect an operation of the preparatory function code. If the auxiliary function code does not affect the operation of the preparatory function code, the process advances to step S33. If the auxiliary function code affects the operation of the preparatory function code, the process advances to step S38.

At step S33, the block rearrangement processing unit 1124 moves the one block including the auxiliary function code ahead of the preceding block in the same manner as in FIG. 5B.

At step S34, the information output unit 113 generates a character string indicating the content of the process performed by the code processing unit 112 and outputs the generated character string to a block immediately before or after the one block including the auxiliary function code processed at step S33.

At step S35, the second integration processing unit 1123 determines whether or not the preceding block does not include an auxiliary function code inexecutable simultaneously. If the preceding block does not include an auxiliary function code inexecutable simultaneously with the auxiliary function code in the one block, the process advances to step S36. If the preceding block includes an auxiliary function code inexecutable simultaneously with the auxiliary function code in the one block, the process advances to step S38.

At step S36, the second integration processing unit 1123 integrates the auxiliary function code with the preceding block in the same manner as in FIGS. 3B and 4B.

At step S37, the information output unit 113 generates a character string indicating a result of the process and outputs the generated character string to a block immediately before or after the block including the auxiliary function code processed at step S36.

At step S38, the code processing unit 112 generates the processed command code. Then, the numerical controller 10 ends the optimization process.

Figure 12:
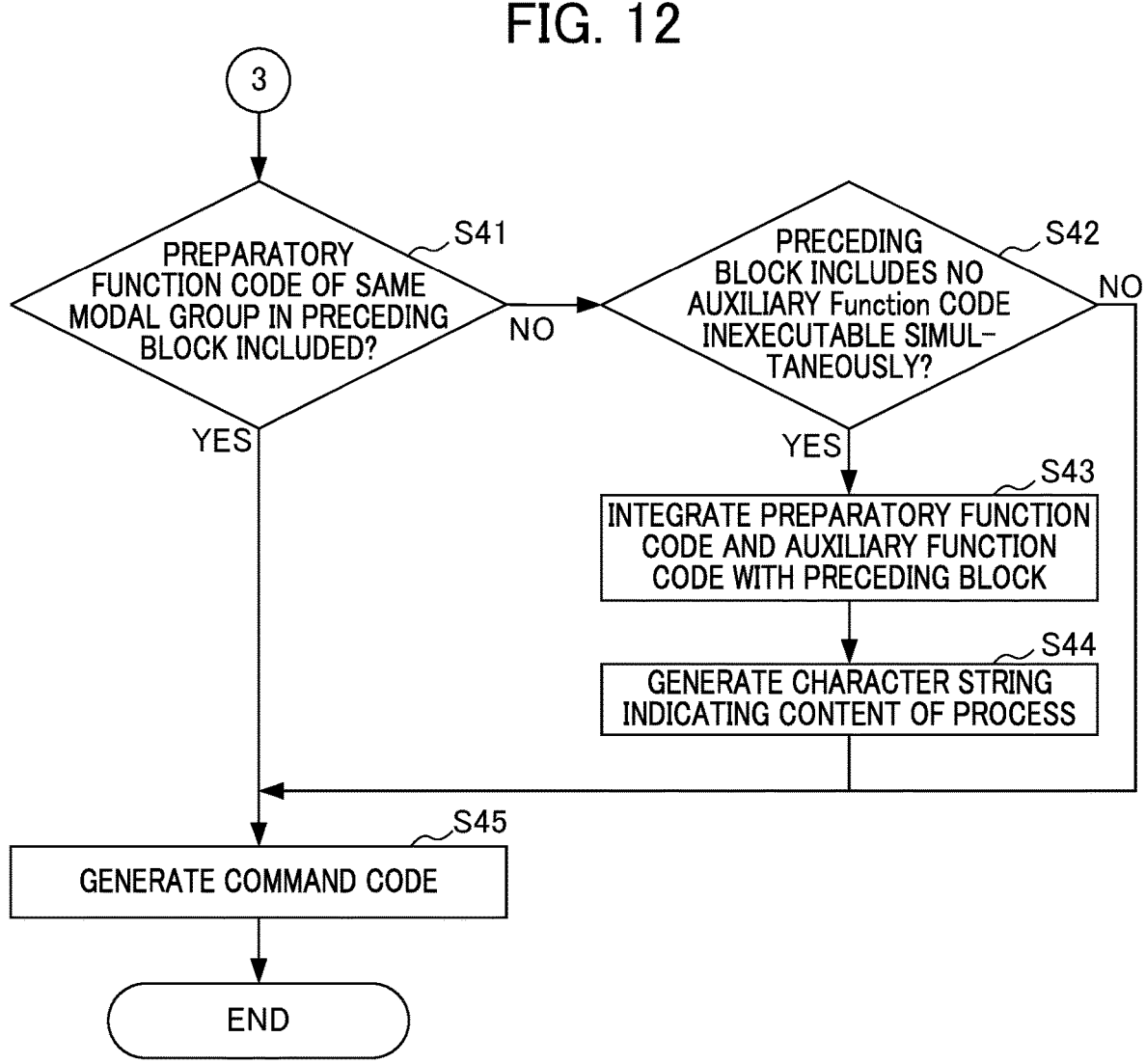
FIG. 12 is a flowchart illustrating a continuation of the optimization process illustrated in FIG. 9.

At step S41 in FIG. 12, the second integration processing unit 1123 determines whether or not the one block determined at step S12 in FIG. 9 includes a preparatory function code of the same modal group in the preceding block. If the preparatory function code is a member of the same modal group as the preparatory function code in the preceding block, the process advances to step S45. If the preparatory function code is not a member of the same modal group as the preparatory function code in the preceding block, the process advances to step S42.

At step S42, the second integration processing unit 1123 determines whether or not the preceding block does not include an auxiliary function code inexecutable simultaneously. If the preceding block does not include an auxiliary function code inexecutable simultaneously with the auxiliary function code in the one block, the process advances to step S43. If the preceding block includes an auxiliary function code inexecutable simultaneously with the auxiliary function code in the one block, the process advances to step S45.

At step S43, the second integration processing unit 1123 integrates the preparatory function code and the auxiliary function code with the preceding block.

At step S44, the information output unit 113 generates a character string indicating the content of the process performed by the code processing unit 112 and outputs the generated character string to a block immediately before or after the block including the preparatory function code and/or the auxiliary function code processed at step S43.

At step S45, the code processing unit 112 generates the processed command code. Then, the numerical controller 10 ends the optimization process.

Figure 13:
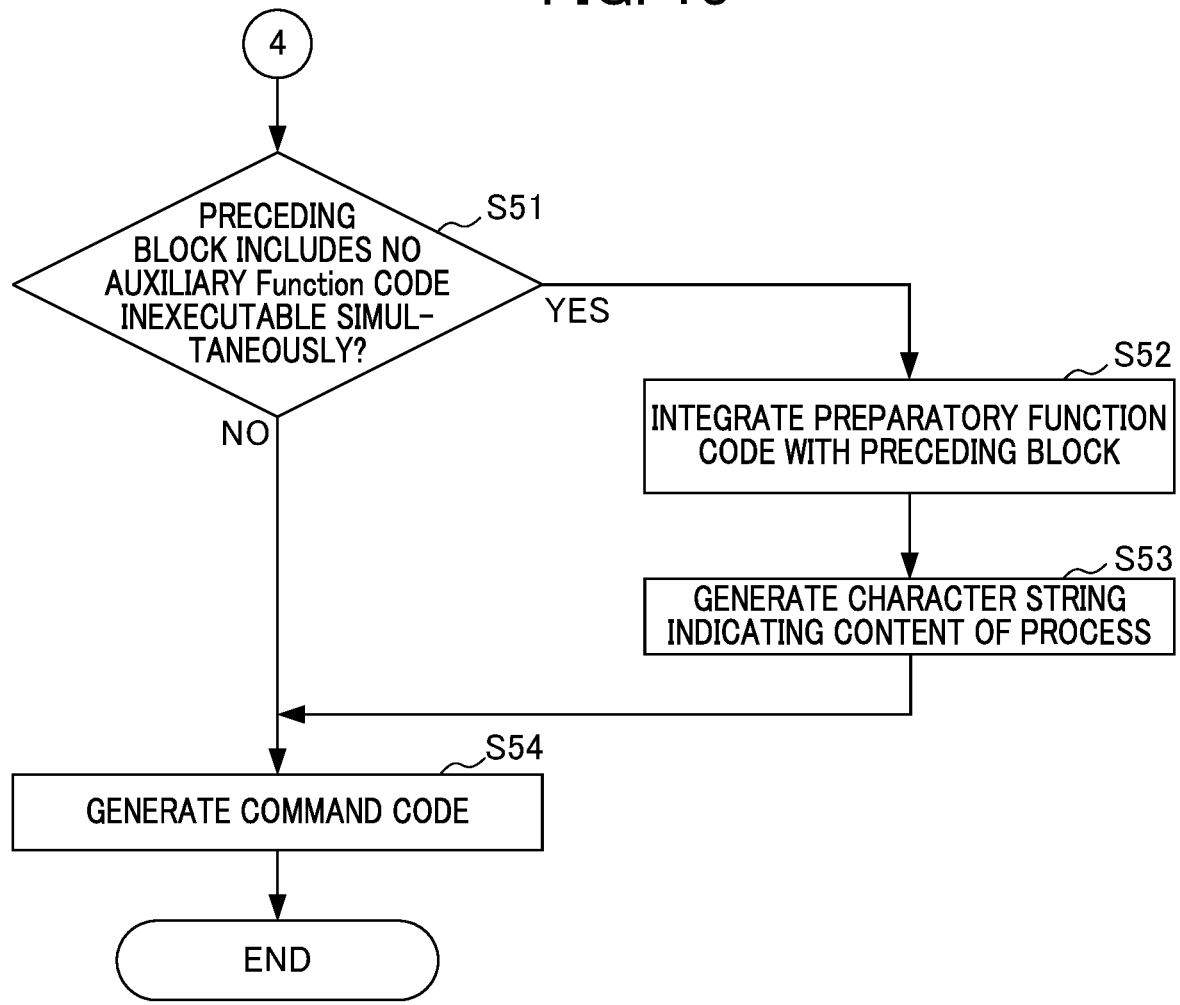
FIG. 13 is a flowchart illustrating a continuation of the optimization process illustrated in FIG. 9.

At step S51 in FIG. 13, the first integration processing unit 1122 determines whether or not the preceding block does not include an auxiliary function code inexecutable simultaneously with the preparatory function code in the one block. If the preceding block does not include an auxiliary function code inexecutable simultaneously with the preparatory function code in the one block, the process advances to step S52. If the preceding block includes an auxiliary function code inexecutable simultaneously with the preparatory function code in the one block, the process advances to step S54.

At step S52, the first integration processing unit 1122 integrates the preparatory function code with the preceding block.

At step S53, the information output unit 113 generates a character string indicating the content of the process performed by the code processing unit 112 and outputs the generated character string to a block immediately before or after the block including the preparatory function code processed at step S52.

At step S54, the code processing unit 112 generates the processed command code. Then, the numerical controller 10 ends the optimization process.

As described above, the numerical controller 10 according to the present embodiment performs the deletion process, the integration process, the block rearrangement process, the coordinate rearrangement process, and the replacement process depending on the command content and arrangement of preparatory function codes and auxiliary function codes in the blocks of the source program 210. This enables the numerical controller 10 to optimize NC program codes included in a generated machining program and expedite operation of the machine tool 20. Consequently, the cycle time is shortened.

One embodiment has been described above. However, the numerical controller 10 is not limited to the embodiment described above, and changes such as modifications and improvements to the extent that the objective of the numerical controller 10 is achieved are encompassed by the numerical controller 10.

Modification Example 1

The embodiment has been described above using an example in which the numerical controller 10 is a different device from the machine tool 20. However, some or all of the functions of the numerical controller 10 may be included in the machine tool 20.

Furthermore, some or all of the functions of the optimization unit 110 of the numerical controller 10 may be implemented as an optimization device through an information processing device such as a computer device.

Alternatively, some or all of the block analysis unit 111, the deletion processing unit 1121, the first integration processing unit 1122, the second integration processing unit 1123, the block rearrangement processing unit 1124, the coordinate rearrangement processing unit 1125, the replacement processing unit 1126, the program execution unit 120, and the storage unit 200 of the numerical controller 10 may be, for example, included in a server. Furthermore, each of the functions of the numerical controller 10 may be implemented using, for example, a virtual server function on a cloud.

Furthermore, the numerical controller 10 may be a distributed processing system in which the functions of the numerical controller 10 are distributed among a plurality of servers as appropriate.

Modification Example 2

The embodiment has been described above using an example in which the information output unit 113 outputs information indicating the content of the process performed by the code processing unit 112 to a block immediately before or after a block including a preparatory function code or an auxiliary function code processed by the code processing unit 112. However, the information output unit 113 is not limited as such. For example, the information output unit 113 may output the information indicating the content of the process performed by the code processing unit 112 to a display unit (not shown) included in the numerical controller 10. The display unit (not shown) may then display the content of the process performed by the code processing unit 112. This enables the operator of the numerical controller 10 to know what process has been performed on the source program 210.

Additionally, the information output unit 113 may calculate an estimated value of the execution time of the object program 220 based on the content of the process performed by the code processing unit 112 and output the estimated value to the display unit (not shown). The display unit (not shown) may then display the estimated value calculated by the information output unit 113. This enables the operator of the numerical controller 10 to know how much the execution time is to be shortened by the optimization process performed on the source program 210.

Modification Example 3

The embodiment has been described above using an example in which the numerical controller 10 generates the object program 220 corresponding to a single machine tool 20. However, the numerical controller 10 is not limited as such. For example, as illustrated in FIG. 14, the numerical controller 10 may generate the object program 220 for each of m machine tools 20A(1) to 20A($m$) ($m$ is an integer equal to or greater than two) connected to a network 50. The numerical controller 10 may then provide a numerical controller (not shown) included in each of the machine tools 20A(1) to 20A($m$) with the corresponding object program 220 so that the object program 220 is executed therein. It is to be noted that the machine tools 20A(1) to 20A($m$) may be of the same type (version) or of different types (versions).

In a case where the machine tools 20A(1) to 20A($m$) are of different types (versions), however, the numerical controller 10 may prestore, in the storage unit 200, a plurality of optimizers corresponding to the types (versions) of the machine tools 20A(1) to 20A($m$). Furthermore, the numerical controller 10 may prestore, in the storage unit 200, an optimizer table storing the association between the types (versions) of the machine tool 20A(1) to 20A($m$) and the optimizers. This enables the numerical controller 10 to generate the object programs 220 optimized according to the respective types (versions) of the machine tools 20A(1) to 20A($m$).

It is to be noted that each of the machine tools 20A(1) to 20A(*m*) is equivalent to the machine tool 20 illustrated in FIG. 1. Hereinafter, the machine tools 20A(1) to 20A(*m*) may be referred to also as "machine tool 20A" when it is not necessary to distinguish the machine tools 20A(1) to 20A(*m*) from one another.

Alternatively, instead of the optimizer table, the numerical controller 10 may display a human-machine interface 300 on the display unit (not shown) of the numerical controller 10 as illustrated in FIG. 15. In this case, the numerical controller 10 may cause the operator to select the version (type) of the machine tool 20A in which the source program 210 is to be executed, on the human-machine interface 300 through an input unit (not shown) such as a touch panel included in the numerical controller 10.

FIG. 15 illustrates an example of the human-machine interface 300.

As illustrated in FIG. 15, the human-machine interface 300 has a selection display region 310 for displaying the version of the machine tool 20A, a display region 320 for displaying the process corresponding to the selected version, and a display region 330 for displaying an additional process corresponding to the selected version.

This enables the operator of the numerical controller 10 to easily know what process is to be performed in the optimization process on the source program 210 by selecting the version of the machine tool 20A.

It is to be noted that each of the functions of the numerical controller 10 according to the embodiment described above can be implemented by hardware, software, or a combination thereof. Being implemented by software herein means being implemented through a computer reading and executing a program.

The program can be supplied to the computer by being stored on any of various types of non-transitory computer readable media. The non-transitory computer readable media include various types of tangible storage media. Examples of the non-transitory computer readable media include magnetic storage media (such as flexible disks, magnetic tape, and hard disk drives), magneto-optical storage media (such as magneto-optical disks), compact disc read only memory (CD-ROM), compact disc recordable (CD-R), compact disc rewritable (CD-R/W), and semiconductor memory (such as mask ROM, programmable ROM (PROM), erasable PROM (EPROM), flash ROM, and RAM). Alternatively, the program may be supplied to the computer using any of various types of transitory computer readable media. Examples of transitory computer readable media include electrical signals, optical signals, and electromagnetic waves. Such transitory computer readable media are able to supply the program to the computer through a wireless communication channel or a wired communication channel such as electrical wires or optical fibers.

It is to be noted that writing the program to be recorded on a storage medium includes processes that are not necessarily performed chronologically and that may be performed in parallel or individually as well as processes that are performed chronologically according to the order thereof.

To put the foregoing into other words, the optimization device according to the present disclosure can take various embodiments having the following constitutions.

(1) An optimization device (numerical controller 10) according to an aspect of the present disclosure includes a block analysis unit 111, a code processing unit 112, and a program generation unit 114. The block analysis unit 111 analyzes a preparatory function code and/or an auxiliary function code for each of a plurality of blocks included in a source program 210. The code processing unit 112 performs a process on the preparatory function code and/or the auxiliary function code in a plurality of successive blocks based on a result of the analysis by the block analysis unit 111 and optimizes the source program 210. The program generation unit 114 generates the source program 210 optimized by the code processing unit 112 as an object program 220.

According to the optimization device, it is possible to optimize NC program codes included in a generated machining program and to expedite operation of a machine tool.

(2) In the optimization device described in (1), the code processing unit 112 may include a deletion processing unit 1121. The deletion processing unit 1121 deletes a preparatory function code from every block other than the first block among the plurality of successive blocks in a case where the preparatory function code in one block is not a code that only affects the one block, and the preparatory function code in the one block is the same as a preparatory function code in any other block adjacent to the one block.

This enables the optimization device to shorten the execution time of the object program 220.

(3) In the optimization device described in (1) or (2), the code processing unit 112 may include a first integration processing unit 1122 and a second integration processing unit 1123. The first integration processing unit 1122 integrates a plurality of blocks among the plurality of successive blocks in a case where a preparatory function code in one block is not a code that only affects the one block, and the preparatory function code in the one block is a member of a modal group differing from that of a preparatory function code in any other block adjacent to the one block. The second integration processing unit 1123 integrates a plurality of blocks among the plurality of successive blocks in a case where a preparatory function code in one block is not a code that only affects the one block, the preparatory function code in the one block is a member of a modal group differing from that of a preparatory function code in any other block adjacent to the one block, and an auxiliary function code included in the block adjacent to the one block does not have to independently give a command to the block adjacent to the one block and is not a conflicting operation.

This enables the optimization device to shorten the cycle time.

(4) In the optimization device described in any one of (1) to (3), the code processing unit 112 may include a block rearrangement processing unit 1124 and a coordinate rearrangement processing unit 1125. The block rearrangement processing unit 1124 rearranges an order of the plurality of successive blocks in a case where an auxiliary function code in one block is not an operation conflicting with a preparatory function code or an auxiliary function code included in a block preceding the one block. The coordinate rearrangement processing unit 1125 rearranges a plurality of coordinate values specified by dimension words included among the plurality of successive blocks to minimize a moving distance between the coordinate values or a total moving time in a case where a preparatory function code in the first block among the plurality of successive blocks is a fixed cycle preparatory function code, and a preparatory function code in the last block among the plurality of successive blocks is a preparatory function code of cancellation of the fixed cycle corresponding to the preparatory function code in the first block.

This enables the optimization device to shorten the execution time of the object program 220 and the cycle time.

(5) In the optimization device described in any one of (1) to (4), the code processing unit 112 may include a replacement processing unit 1126. The replacement processing unit 1126 replaces the plurality of successive blocks with a combination of preparatory function codes from a fixed cycle preparatory function code to an interpolation preparatory function code in a case where a preparatory function code in the first block among the plurality of successive blocks is a fixed cycle preparatory function code, and a preparatory function code in the last block among the plurality of successive blocks is a preparatory function code of cancellation of the fixed cycle corresponding to the preparatory function code in the first block.

This enables the optimization device to shorten the execution time of the object program 220.

(6) In the optimization device described in any one of (1) to (5), the program generation unit 114 may generate the object program 220 to replace the source program 210.

This enables the optimization device to conserve the storage capacity of the storage unit 200.

(7) In the optimization device described in any one of claims (1) to (5), the program generation unit 114 may generate the object program 220 as a new program differing from the source program 210.

This enables the optimization device to generate the object program 220 for a plurality of machine tools 20 on a per-machine tool basis using a single source program 210.

(8) The optimization device described in any one of (1) to (7) may further include an information output unit 113. The information output unit 113 outputs information indicating the content of the process performed by the code processing unit 112 to a block immediately before or after a block including the processed preparatory function code or the processed auxiliary function code.

This enables the operator of the numerical controller 10 to know what process has been performed on each block in the source program 210.

(9) The optimization device described in any one of (1) to (8) may further include a human-machine interface 300 and an input unit. The input unit receives, from an operator, a selection of a machine tool 20 in which the source program 210 is to be executed, using the human-machine interface 300. The code processing unit 112 may change the process to be performed on the source program 210 based on the selected machine tool 20A.

This enables the optimization device to generate an object program 220 optimized for the selected machine tool 20A.

(10) The optimization device described in any one of (1) to (9) may further include a display unit. The display unit displays information indicating the content of the process performed by the code processing unit 112.

This enables the operator of the numerical controller 10 to know what process has been performed on the source program 210.

(11) In the optimization device described in (10), the display unit may display an estimated value of an execution time of the generated object program 220 based on the process performed by the code processing unit 112.

This enables the operator of the numerical controller 10 to know how much the execution time is to be shortened by the optimization process performed on the source program 210.

EXPLANATION OF REFERENCE NUMERALS

1: Control system
10: Numerical controller
20: Machine tool
111: Block analysis unit
112: Code processing unit
1121: Deletion processing unit
1122: First integration processing unit
1123: Second integration processing unit
1124: Block rearrangement processing unit
1125: Coordinate rearrangement processing unit
1126: Replacement processing unit
113: Information output unit
114: NC program generation unit
210: Source program
220: Object program

What is claimed is:

1. An optimization device comprising:
a storage unit configured to store an optimizer table that includes an association between different types of industrial machines and a corresponding optimizing process to be performed on a first program executed in each of the industrial machines;
a block analysis unit configured to receive the first program for an industrial machine among the different types of the industrial machines and to analyze a preparatory function code or an auxiliary function code for each of a plurality of blocks included in the first program;
a code processing unit configured to perform the optimizing process on the preparatory function code or the auxiliary function code in a plurality of successive blocks based on a result of the analysis by the block analysis unit and optimize the first program; and
a program generation unit configured to generate the first program optimized by the code processing unit as a second program to be sent to the industrial machine.

2. The optimization device according to claim 1, wherein the code processing unit includes
a deletion processing unit configured to delete the preparatory function code from every block other than a first block among the plurality of successive blocks in a case where the preparatory function code in one block is not a code that only affects the one block, and the preparatory function code in the one block is the same as a preparatory function code in any other block adjacent to the one block.

3. The optimization device according to claim 1, wherein the code processing unit includes
a first integration processing unit configured to integrate a plurality of blocks among the plurality of successive blocks in a case where the preparatory function code in one block is not a code that only affects the one block, and the preparatory function code in the one block is a member of a modal group differing from that of the preparatory function code in any other block adjacent to the one block, and
a second integration processing unit configured to integrate the plurality of blocks among the plurality of successive blocks in a case where the preparatory function code in the one block is not a code that only affects the one block, the preparatory function code in the one block is a member of the modal group differing from that of the preparatory function code in any other block adjacent to the one block, and an auxiliary function code included in the block adjacent to the one block does not have to independently give a command to the block adjacent to the one block and is not a conflicting operation.

4. The optimization device according to claim 1, wherein the code processing unit includes a block rearrangement processing unit configured to rearrange an order of the plurality of successive blocks in a case where an auxiliary function code in one block is not an operation conflicting with the preparatory function code or the auxiliary function code included in a block preceding the one block, and a coordinate rearrangement processing unit configured to rearrange a plurality of coordinate values specified by dimension words included among the plurality of successive blocks to minimize a moving distance between the coordinate values or a total moving time in a case where the preparatory function code in the first block among the plurality of successive blocks is a fixed cycle preparation function code, and the preparatory function code in a last block among the plurality of successive blocks is a preparation function code of cancellation of the fixed cycle corresponding to the preparatory function code in the first block.

5. The optimization device according to claim 1, wherein the code processing unit includes a replacement processing unit configured to replace the plurality of successive blocks with a combination of preparatory function codes, the replacement of the plurality of successive blocks being from a fixed cycle preparatory function code to an interpolation preparatory function code in a case where the preparatory function code in the first block among the plurality of successive blocks is a fixed cycle preparation function code, and the preparatory function code in the last block among the plurality of successive blocks is a preparation function code of cancellation of the fixed cycle corresponding to the preparatory function code in the first block.

6. The optimization device according to claim 1, wherein the program generation unit generates the second program to replace the first program.

7. The optimization device according to claim 1, wherein the program generation unit generates the second program as a new program differing from the first program.

8. The optimization device according to claim 1, further comprising an information output unit configured to output information indicating content of the process performed by the code processing unit to a block immediately before or after a block including the processed preparatory function code or the processed auxiliary function code.

9. The optimization device according to claim 1, further comprising:

a human-machine interface; and an input unit configured to receive, from an operator, a selection of the industrial machine in which the first program is to be executed, using the human-machine interface, wherein the code processing unit changes the process to be performed on the first program based on the selected industrial machine.

10. The optimization device according to claim 1, further comprising a display unit configured to display information indicating content of the process performed by the code processing unit.

11. The optimization device according to claim 10, wherein the display unit displays an estimated value of an execution time of the generated second program based on the process performed by the code processing unit.

* * * * *